US012587119B2

(12) United States Patent
Zabala Zabaleta et al.

(10) Patent No.: US 12,587,119 B2
(45) Date of Patent: Mar. 24, 2026

(54) CASCADE ACTIVATION METHOD AND MECHATRONIC SYSTEM

(71) Applicant: OJMAR, S.A., Elgoibar (ES)

(72) Inventors: Jon Zabala Zabaleta, Elgoibar (ES); Aketza Elices Ruiz, Elgoibar (ES)

(73) Assignee: OJMAR, S.A., Elgoibar (ES)

( * ) Notice: Subject to any disclaimer, the term of this patent is extended or adjusted under 35 U.S.C. 154(b) by 0 days.

(21) Appl. No.: 18/816,901

(22) Filed: Aug. 27, 2024

(65) Prior Publication Data

US 2024/0421732 A1 Dec. 19, 2024

Related U.S. Application Data

(63) Continuation of application No. 18/085,981, filed on Dec. 21, 2022, now Pat. No. 12,074,556.

(30) Foreign Application Priority Data

Dec. 22, 2021 (ES) ................................ ES202131190

(51) Int. Cl.
*H02P 9/30* (2006.01)
*H02J 1/14* (2006.01)
(Continued)

(52) U.S. Cl.
CPC ................ *H02P 9/305* (2013.01); *H02J 1/14* (2013.01); *H02J 7/345* (2013.01); *E05B 2047/0054* (2013.01); *E05B 2047/0062* (2013.01)

(58) Field of Classification Search
CPC ... H02P 9/305; H02J 1/14; H02J 7/345; E05B 47/0001; E05B 2047/0058
See application file for complete search history.

(56) References Cited

U.S. PATENT DOCUMENTS 4,843,300 A 6/1989 Alderman
4,985,670 A 1/1991 Kaneyuki et al.
(Continued)

FOREIGN PATENT DOCUMENTS

DE 20114838 12/2001
ES 2331500 1/2010

OTHER PUBLICATIONS

Notice of Allowance and Fee(s) Due dated Apr. 30, 2025 in U.S. Appl. No. 18/102,386.
(Continued)

*Primary Examiner* — Pedro J Cuevas
(74) *Attorney, Agent, or Firm* — Pearl Cohen Zedek Latzer Baratz LLP

(57) ABSTRACT

The invention relates to a cascade activation method and mechatronic system for simultaneous generation and consumption. The system includes a non-return diode connected to an electric generator; a first voltage regulator connected to a microcontroller; a voltage converter; and an actuator, which has an activation voltage greater than the first activation voltage of the first voltage regulator. The actuator is configured to simultaneously consume a portion of the electrical energy generated by the electric generator. The method includes the steps of listing the elements of the mechatronic system that require power; calculating the activation sequence of the elements based on the minimum activation voltage and the activation time interval; selecting the electric generator based on the energy/power that needs to be provided to the mechatronic system; and programming the microcontroller with the activation sequence.

20 Claims, 6 Drawing Sheets

(51) Int. Cl.
| | |
|---|---|
| *H02J 7/34* | (2006.01) |
| *E05B 47/00* | (2006.01) |

(56) References Cited

U.S. PATENT DOCUMENTS

| | | | | |
|---|---|---|---|---|
| 5,994,789 | A * | 11/1999 | Ochiai | B60L 15/2009 |
| | | | | 307/19 |
| 6,384,551 | B1 | 5/2002 | Watanabe | |
| 6,527,310 | B1 | 3/2003 | Bellamy | |
| 6,747,425 | B2 | 6/2004 | Marshall, III et al. | |
| 6,792,341 | B2 * | 9/2004 | Hunt | B60L 58/33 |
| | | | | 701/99 |
| 6,813,917 | B2 | 11/2004 | Miller et al. | |
| 7,030,511 | B2 * | 4/2006 | Zarei | B60L 50/15 |
| | | | | 307/9.1 |
| 7,224,146 | B2 | 5/2007 | Poore et al. | |
| 7,768,244 | B2 | 8/2010 | Perol | |
| 7,886,857 | B2 * | 2/2011 | Fujitake | B60L 15/007 |
| | | | | 180/2.1 |
| 8,040,092 | B2 | 10/2011 | Peterson | |
| 8,253,400 | B2 * | 8/2012 | Irissou | H02M 3/156 |
| | | | | 323/282 |
| 8,760,080 | B2 | 6/2014 | Yu | |
| 9,024,533 | B2 * | 5/2015 | Gossehelweg | H02M 3/156 |
| | | | | 315/308 |
| 9,093,894 | B2 | 7/2015 | Liu | |
| 9,172,314 | B2 | 10/2015 | Koyama | |
| 9,581,635 | B2 * | 2/2017 | Moga | B60L 3/0023 |
| 9,718,366 | B2 * | 8/2017 | Matsuda | B60L 15/20 |
| 9,755,456 | B1 | 9/2017 | Peterson et al. | |
| 9,815,375 | B2 * | 11/2017 | Matsuda | B60L 58/10 |
| 10,017,058 | B2 * | 7/2018 | Nomura | H02M 7/44 |
| 10,179,512 | B2 * | 1/2019 | Matsuda | B60L 58/26 |
| 11,167,704 | B2 * | 11/2021 | Nunokawa | B60R 16/0307 |
| 11,292,346 | B2 * | 4/2022 | Duan | B60W 20/14 |
| 11,545,728 | B2 * | 1/2023 | Yang | H02J 7/007194 |
| 11,699,390 | B2 | 7/2023 | Hendrix | |
| 11,745,614 | B2 * | 9/2023 | O'Connor | B60L 53/57 |
| | | | | 320/109 |
| 12,304,344 | B2 * | 5/2025 | Tachibana | B60L 58/12 |
| 2002/0047686 | A1 | 4/2002 | Kodama et al. | |
| 2003/0137261 | A1 | 7/2003 | Marshall, III et al. | |
| 2003/0191576 | A1 * | 10/2003 | Zarei | B60W 20/00 |
| | | | | 701/105 |
| 2004/0083039 | A1 * | 4/2004 | Hunt | B60L 58/33 |
| | | | | 180/65.265 |
| 2004/0095667 | A1 | 5/2004 | Jain et al. | |
| 2007/0247115 | A1 | 10/2007 | Ishikawa et al. | |
| 2008/0011528 | A1 * | 1/2008 | Verbrugge | B60K 6/28 |
| | | | | 180/65.29 |
| 2008/0247201 | A1 | 10/2008 | Perol | |
| 2009/0033100 | A1 * | 2/2009 | Dai | |
| 2010/0033146 | A1 * | 2/2010 | Irissou | H02M 3/156 |
| | | | | 323/282 |
| 2010/0127650 | A1 | 5/2010 | Peterson | |
| 2010/0212381 | A1 | 8/2010 | Huang et al. | |
| 2013/0009568 | A1 | 1/2013 | Yu | |
| 2013/0335193 | A1 | 12/2013 | Hanson et al. | |
| 2014/0167728 | A1 | 6/2014 | Liu | |
| 2014/0312685 | A1 * | 10/2014 | Moga | G01R 31/55 |
| | | | | 307/9.1 |
| 2015/0021985 | A1 * | 1/2015 | Matsuda | B60L 58/15 |
| | | | | 307/10.1 |
| 2015/0042160 | A1 * | 2/2015 | Matsuda | B62J 43/16 |
| | | | | 307/10.3 |
| 2016/0250928 | A1 * | 9/2016 | Matsuda | B60L 53/53 |
| | | | | 701/22 |
| 2017/0274782 | A1 * | 9/2017 | Nomura | H02M 7/44 |
| 2019/0249723 | A1 | 8/2019 | Lu | |
| 2020/0141157 | A1 | 5/2020 | Miller et al. | |
| 2020/0298776 | A1 * | 9/2020 | Nunokawa | B60R 16/03 |
| 2020/0349786 | A1 | 11/2020 | Ho et al. | |
| 2021/0221238 | A1 * | 7/2021 | Duan | B60L 50/61 |
| 2023/0066436 | A1 | 3/2023 | Rutkowski | |
| 2023/0078180 | A1 | 3/2023 | Hendrix | |
| 2023/0400870 | A1 | 12/2023 | Nam | |
| 2025/0135926 | A1 * | 5/2025 | Ammanamanchi | |
| | | | | H02M 3/33584 |

OTHER PUBLICATIONS

Office Action dated Oct. 17, 2024 in U.S. Appl. No. 18/102,386.

International Search Report and Written Opinion, with English language translation of Written Opinion, in International Patent Application No. PCT/ES2023/070035.

English language translation of Abstract for ES2331500 published Jan. 5, 2010.

English language translation of Abstract for DE20114838 published Dec. 13, 2001.

Preliminary Amendment dated Oct. 11, 2023 in U.S. Appl. No. 18/102,386.

Response to International Search Report and Written Opinion dated Nov. 24, 2023 in International Patent Application No. PCT/ES2023/070035.

Preliminary Amendment dated Oct. 11, 2023 in U.S. Appl. No. 18/085,981.

Notice of Allowance dated Apr. 30, 2024 in U.S. Appl. No. 18/085,981.

Amendment after Allowance dated Jun. 12, 2024 in U.S. Appl. No. 18/085,981.

Response to Office Action dated Oct. 26, 2023 in Patent Application No. P202230066, with machine translation thereof.

* cited by examiner

CASCADE ACTIVATION METHOD AND MECHATRONIC SYSTEM

PRIORITY CLAIM

This application is a continuation of U.S. patent application Ser. No. 18/085,981 filed on Dec. 21, 2022, which application claims priority to Spanish Patent Application No. P202131190, filed Dec. 22, 2021, which applications are incorporated by reference herein in.

BACKGROUND OF THE INVENTION

Field of the Invention

The object of the invention is to provide a power supply without batteries or high capacity capacitors to operate a mechatronic system, such that the energy generated by the electric generator of the mechatronic system is instantly and simultaneously consumed by the elements that require energy to operate, such as microcontrollers, sensors, actuators, etc.

The invention uses the increasing electrical energy produced by a mechatronic electric generator to cascade the components of the mechatronic system, starting with the control portion (microcontrollers) since this portion has the lowest operating voltage and power, and continuing with the rest of the components of the mechatronic system such as sensors and actuators that have a higher activation voltage and power than that of the microcontroller.

Description of Related Art

The present invention belongs to the mechatronics sector, and more specifically to the power supply of embedded systems with low power consumption wherein electrical energy comes from an electric generator that converts mechanical energy into electrical energy.

Technical Problem to be Solved and Background of the Invention

Currently, there are many ways to electrically power embedded systems. The most common systems are wired systems and those that operate with rechargeable or changeable batteries, and even systems that are used with rechargeable batteries through the technology known as "Energy Harvesting". In recent times, however, embedded systems without batteries have become very mainstream due to the problems of environmental sustainability that batteries entail.

To replace batteries, supercapacitors are used with different ways of generating energy; there are generators that generate continuous energy for a long time (solar panels, temperature or vibration energy harvesters, etc.), but there are other types of generators that generate considerable energy in a short period of time (dynamos, piezoelectric materials, etc.).

The problem with using a supercapacitor is that, unlike a battery, the voltage across the supercapacitor depends on the amount of energy stored. In other words, the voltage decreases virtually linearly as the supercapacitor delivers the charge it has stored, whereas the battery is capable of delivering the charge and maintaining the voltage almost constant until the battery is completely discharged, at which point the voltage across the battery terminals decreases exponentially.

The main problem with generating electrical energy from scratch in a short period of time, and using it in that same time, or a few seconds later, is that if said energy is stored in a supercapacitor or a capacitor, for its later use, there is a high percentage of electrical energy that cannot be used, since its voltage does not reach the minimum voltage required for the correct operation of the embedded system.

As an example, FIG. 1 shows that for a 5.5V supercapacitor and an embedded mechatronic system in a lock that operates with a minimum voltage of 3.3V, around 20% of the energy generated by the electric generator will be useless. The higher the capacity of the capacitor, the more energy will be required to reach the voltage needed to use the mechatronic system.

As an example, the results of a recharge test of 5.5V supercapacitors with different capacities are shown; they have been charged at a 100 mA current and the recharge time of each one has been calculated. If we assume that the operating voltages of the embedded system range from 3.3V to 5.5V, all the energy charged up to 3.3V is energy that cannot be used. The result obtained is the following:

5.5V and 0.1 F:
  From 0 to 5.5V: Average voltage=3.797658 V; Total
    time=3.213788 s; Power=0.339 mWh
  From 0 to 3.3V: Average voltage=2.491079V; Total
    time=1.019281 s;
  Power=0.071 mWh
  21% of the energy generated cannot be used
5.5V and 0.22 F:
  From 0 to 5.5V: Average voltage=3.695646 V; Total
    time=4.945991 s; Power=0.508 mWh
  From 0 to 3.3V: Average voltage=2.474711 V; Total
    time=1.730389 s; Power=0.119 mWh
  23% of the energy generated cannot be used
5.5V and 1 F:
  From 0 to 5.5V: Average voltage=3.944717 V; Total
    time=26.610774 s; Power=2.916 mWh
  From 0 to 3.3V: Average voltage=2.673263 V; Total
    time=7.893806 s; Power=0.586 mWh
  20% of the energy generated cannot be used

SUMMARY OF THE INVENTION

The present invention discloses several aspects related to mechatronic systems, including a method of activating them.

In the present description, and given that it relates to electrical components, the term "connected" means that two elements that are "connected" can be directly connected and/or connected through other elements. Likewise, the term "connected" can refer to an electrical connection (power supply) and/or a data connection.

In a first aspect of the invention, a cascade activation mechatronic system is disclosed which comprises an electric generator that generates variable voltage electrical energy from a minimum voltage to a maximum voltage, from mechanical energy. The electrical energy generated by the electric generator is of variable voltage over time and can have different shapes (bell, peak, etc.), such that the shape of variable voltage electrical energy begins at a minimum voltage and reaches a maximum voltage where it is maintained for a short time (peak shape) or a long time (bell shape) and then falls back down to the minimum voltage value. The cascade activation mechatronic system of the present invention further comprises:

a first voltage regulator connected to an output of the electric generator, for powering the first voltage regulator, wherein the first voltage regulator generates at least one first activation voltage greater than the minimum voltage of the electric generator;

a microcontroller connected to an output of the first voltage regulator for powering the microcontroller, wherein the microcontroller has a power supply voltage equivalent to the first activation voltage;

a voltage converter connected to an output of the electric generator and grounding for powering the voltage converter, wherein the voltage converter is configured to generate and send an activation signal to the microcontroller for any voltage value, greater than or equal to the minimum voltage of the electric generator; the activation signal indicates to the microcontroller that the electric generator is generating energy;

an actuator connected to the output of the electric generator, for powering the actuator with unregulated voltage, wherein the actuator has an activation voltage greater than the first activation voltage of the first voltage regulator, and wherein the actuator is configured to simultaneously consume a portion of the electrical energy generated by the electric generator.

In other words, the microcontroller is the element with the lowest power supply/activation voltage of all the elements comprised in the mechatronic system except for the voltage converter. The voltage converter is in charge of communicating to the microcontroller that there is voltage in the electric generator. In this way, the microcontroller is the first element in the system that is activated to be able to control the operation of the rest of the elements comprised in the mechatronic system. The microcontroller uses data lines to communicate with the rest of the elements in the system. In one embodiment of the invention, the microcontroller comprises an activation line that can be connected to the actuator for the actuator to be activated/deactivated by the microcontroller. For any embodiment of the invention, the microcontroller has a non-volatile memory to store data.

In the present description, a "voltage regulator with an activation voltage" is an electronic device that, for any voltage value it receives at its input, the voltage regulator has at its output a constant voltage value that corresponds to the "activation voltage". In this way, and applying the foregoing to the "microcontroller" and the "first voltage regulator", the "first voltage regulator" generates at its output a constant voltage whose value is the "first activation voltage" which is the voltage that the microcontroller requires to be activated/powered, provided that the power at the input of the voltage regulator is greater than or equal to the power at the output of the voltage regulator.

In one embodiment of the invention, the cascade activation mechatronic system may comprise a second voltage regulator with a second activation voltage greater than the first activation voltage, and wherein the second voltage regulator has an input connected to the output of the electric generator.

In one embodiment of the invention, the cascade activation mechatronic system may comprise a third voltage regulator with a third activation voltage greater than the second activation voltage, and wherein the third voltage regulator has an input connected to the output of the electric generator.

In one embodiment of the invention, the cascade activation mechatronic system may comprise a fourth and successive voltage regulators if each voltage regulator has an activation voltage greater than the previous one.

In one embodiment of the invention, the cascade activation mechatronic system may comprise a multi-level voltage regulator comprising the first voltage regulator, the second voltage regulator, the third voltage regulator, and the fourth and successive voltage regulators of previous embodiments. The multi-level voltage regulator has an input connected to the electric generator and different outputs, that is, at least as many outputs as internal voltage regulators that the multi-level voltage regulator has.

In another embodiment of the invention, the cascade activation mechatronic system may comprise a non-return diode connected to an output of the electric generator. The non-return diode prevents energy from returning to the electric generator and being lost.

In another embodiment of the invention, the cascade activation mechatronic system may also comprise a capacitor connected to the output of the non-return diode and grounding, wherein the capacitor is configured to eliminate the noise of the variable voltage electrical energy from the electric generator, absorb switching peaks or sensor/actuator start-up and store the variable voltage electrical energy not consumed by the rest of the elements of the circuit (voltage regulators, microcontroller, voltage converter, sensor, actuator).

In another embodiment of the invention, the third voltage regulator is interconnected between the actuator and the electric generator. In this way, the actuator receives from the third voltage regulator a power supply with regulated voltage provided by the third voltage regulator.

In another embodiment of the invention, the cascade activation mechatronic system of the present invention comprises a sensor connected to the second voltage regulator. The sensor has a power supply voltage equal to the second activation voltage of the second voltage regulator. The sensor is configured to simultaneously consume a portion of the electrical energy generated by the electric generator.

In another embodiment of the invention, the microcontroller is further configured to activate the sensor and the actuator, sequentially at predefined time intervals. The predefined time intervals require prior knowledge of the way in which energy is generated by the electric generator. Specifically, the time elapsed is calculated from when energy starts to be generated by the electric generator (beginning of the curve) until when the voltage/power is sufficient to activate the components of the system such as the microcontroller, the voltage regulators, the sensor(s), and the actuator(s).

In another embodiment of the invention, the cascade activation mechatronic system may comprise a voltage meter connected between the output of the electric generator and grounding. The voltage meter is configured to measure the variable voltage of the electrical energy generated by the electric generator and to send the measured voltage to the microcontroller. If a sensor is connected to the second voltage meter, the microcontroller sends an activation signal to the sensor when the measured voltage is equal to the second activation voltage. If an actuator is connected to the third voltage meter, the microcontroller sends an activation signal to the actuator when the measured voltage is equal to the third activation voltage. If an actuator is connected to the output of the electric generator, the microcontroller sends an activation signal to the actuator when the measured voltage is equal to the activation/power supply voltage of the actuator.

In another embodiment of the invention, the actuator is a motor. The motor may be connected to the output of the electric generator for a non-regulated power supply, i.e., non-constant voltage, to the motor. Alternatively, the motor may be connected to the output of a voltage regulator for a constant voltage power supply to the motor, depending on the needs of the motor.

In another embodiment of the invention, the sensor may comprise an antenna controller and an antenna, wherein the antenna controller is connected to the microcontroller through a communication bus so that the microcontroller can control the antenna controller as well as send/receive data through the antenna.

In a second aspect of the invention, a cascade activation method for a mechatronic system is disclosed. The cascade activation method for a mechatronic system comprises the following steps:

analyzing the mechatronic system according to the following sub-steps:

listing the elements of the mechatronic system that require power;

calculating the minimum activation/power supply voltage required for each element listed in the previous sub-step;

calculating the activation time interval in which each element is activated;

calculating the activation sequence of the elements based on the minimum activation voltage and the activation time interval of each element in such a way that the activation sequence:

starts at the lowest activation/power supply voltages and builds up to the highest activation/power supply voltages; and, in case two or more elements have equal activation/power supply voltages, the activation sequence prioritizes the element with the longest activation time interval;

selecting the electric generator based on the energy/power that needs to be provided to the mechatronic system. In other words, the electric generator must provide an energy/power equal to or greater than the sum of all the energies/powers of all the elements comprised in the mechatronic system and that consume energy/power, such as at least the microcontroller, the voltage regulators, the sensor and the actuator, and optionally, at least the capacitor; and, programming the microcontroller with the activation sequence. Optionally, programming the microcontroller with additional control parameters of the mechatronic system selected from control and warning the user of a malfunction, insufficient energy and incorrect readings.

In an embodiment of the invention, the cascade activation method for a mechatronic system further comprises programming the microcontroller to perform additional functions in case the capacitor has stored energy. The additional functions are selected from storage in the internal memory of the microcontroller, and lighting a warning LED.

In a third aspect of the invention, a cascade activation method for a mechatronic system is disclosed, which comprises an electric generator that generates electrical energy from mechanical energy connected to a first voltage regulator with a first activation voltage and to a second voltage regulator with a second activation voltage greater than the first activation voltage. The method comprises connecting a microcontroller to the first voltage regulator and a sensor/actuator to the second voltage regulator in such a way that the electric generator generates electrical energy from a minimum value to a maximum value wherein the microcontroller is activated upon receiving the first activation voltage and the sensor/actuator is activated upon receiving the second activation voltage.

DESCRIPTION OF THE INVENTION

The exemplary embodiments of the invention are described below, based on numerical data referring to the energy consumption of mechatronic systems.

The system disclosed by the present invention consumes energy at the same time that it is being generated, in other words, the generated energy is not stored. In this way, the use of a capacitor or supercapacitor of large capacities is avoided and the size or the necessary force of the electric generator can be reduced by 20%-25% with the aim of avoiding or minimizing energy waste, depending on the minimum and maximum operating voltage of the system.

By means of the system of the present invention, an electric generator 2 is used, which converts mechanical energy, produced by a rectilinear or circular movement, into electrical energy, and the mechatronics is activated, performs all its actions and returns to its idle state during the time the electric generator is generating energy.

With the system of the present invention, it is also possible to accelerate the action of the mechatronics, being able to start operating at almost the same moment as when the electric generator begins to generate electrical energy.

Depending on the application/use and the electrical energy required by the mechatronic system 1, a capacitor 7 with a capacity that is not very high in relation to the electrical energy supplied by the electric generator 2 is used, electrical generator which main function is to stabilize the voltage provided by the electric generator 2 and provide energy at high consumption peaks such as the start-up of an actuator. The energy stored in the capacitor comes from the energy not consumed in the very energy pulse generation cycle (FIGS. 2 and 4) or from previous cycles.

At the same time, when the action/cycle ends, the capacitor 7 is charged with electrical energy, which can be used to perform some low-consumption action, such as flashing a LED, activating a buzzer, saving certain data in a non-volatile memory, activating a flip-dot that is used to indicate the open/closed state of the door, etc.

In the event that the action/cycle has not ended and the electric generator 2 stops generating energy, the capacitor 7 with minimum capacity leaves enough energy to save the data in the non-volatile memory of the microcontroller 8.

Figure 1:
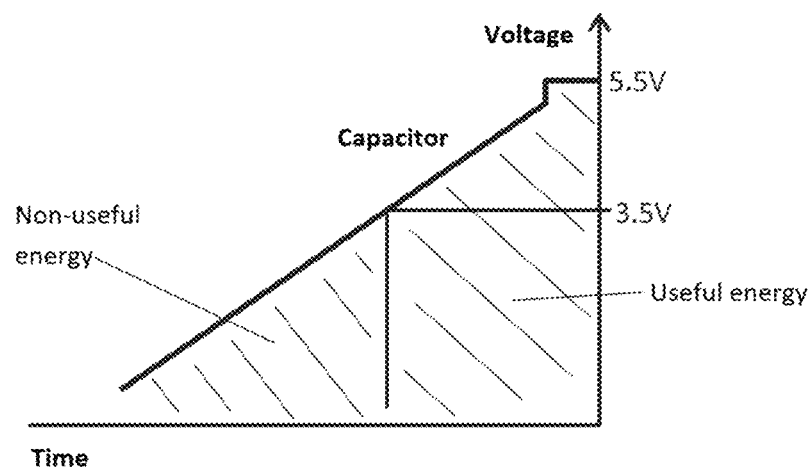
FIG. 1 shows the rise in voltage relative to the amount of energy stored for a supercapacitor as a function of the voltage-time relationship.
Figure 2:
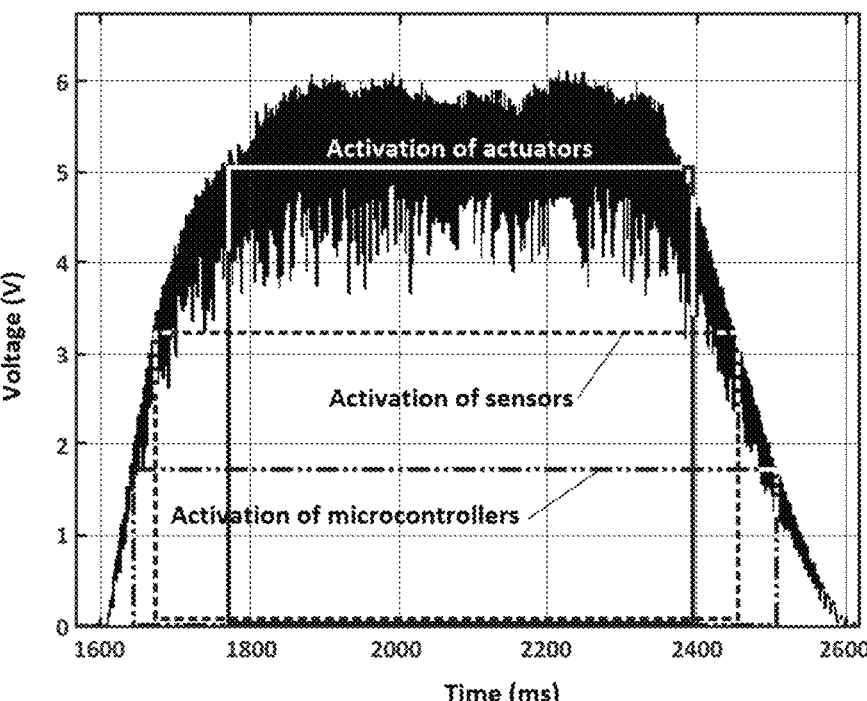
FIG. 2 shows a representative graph of the voltage as a function of time for energy generated in a mechatronic system and the activation values of the mechatronic components comprised in the mechatronic system.

FIG. 2 shows the way in which the electric generator 2 transforms mechanical energy into electrical energy, where it is shown to have a concave bell shape. In other words, at the beginning of the mechanical movement, the electrical energy generated is low, during the course of the movement the electrical energy increases, and towards the end of the bell, the electrical energy decreases again.

Figure 4:
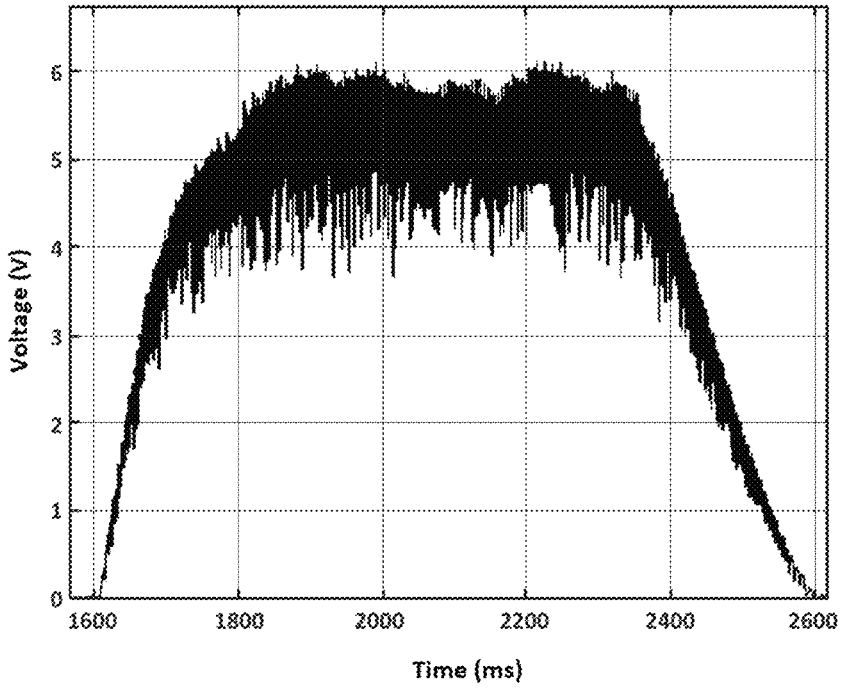
FIG. 4 shows a representative graph of the voltage as a function of time for energy generated in a mechatronic system.

As shown in FIGS. 2 and 4, the electric generator 2 generates electric energy from a minimum value to a maximum value, then it stabilizes and finally decreases. In this way, the first voltage regulator 3 is activated upon receiving the first activation voltage (and consequently the microcontroller 8); moments later, the second voltage regulator 4 is activated upon receiving the second activation voltage (and consequently the sensor 9$b$ and the sensor controller 9$a$); and moments later, the third voltage regulator 5 is activated upon receiving the third activation voltage (and consequently the actuator (10)). Examples of increasing activation voltages are 1.8V, 3V, and 5V.

To take advantage of the energy generated by the electric generator 2 in a mechatronic system, a cascade activation methodology has been developed. This methodology consists of converting the voltage that the electric generator 2 provides to the operating/activation voltage of each portion of the circuit.

For example, see FIG. 2, the microcontroller 8 generally starts operating at 1.8 Volts, such that when the electric generator 2 reaches that voltage level, the microcontroller 8 starts operating. Then the rest of the elements of the mechatronic system, such as sensors 9 and actuators 10, start to operate when the electric generator 2 reaches the minimum operating voltage of the sensors 9 and actuators 10. The sensors 9 typically require more power supply/activation voltage than the microcontrollers 8 but less than the actuators 10.

With the cascade activation of the present invention, the minimum starting voltage is further decreased and the action that is performed with each energy generation cycle is accelerated.

With the cascade activation of the mechatronic system of the present invention with a regulator dedicated to each element (microcontroller, sensor, actuator) of the mechatronic system, each voltage regulator powers only one portion of the circuit (microcontroller, sensor, actuator), and each element (microcontroller, sensor, actuator) will be active as long as the power supply voltage exceeds the voltage of the voltage regulator. Thus, as shown in FIG. 2, the 1.8V voltage regulator for the microcontroller is active for more time at the beginning and at the end than the 3.3V regulators for "sensors" or the 5V regulators for "actuators". Furthermore, each voltage regulator, according to the embodiment, can send a digital signal to the microcontroller to indicate that the voltage regulator is active.

It is important that the order of activation of the elements of the mechatronic system coincides with the order in which it is necessary to activate each component, for the invention to operate correctly. The microcontroller is usually the component that requires the least voltage, followed by the sensors and actuators, such that the cascade activation mechatronic system has the advantage of being able to accelerate the action to be performed with the mechatronic system. There is no order of activation established by microcontroller-sensors-actuators, but an order is established based on the activation voltages of each element (microcontroller, sensors, actuators).

Figures 3A, 3B:
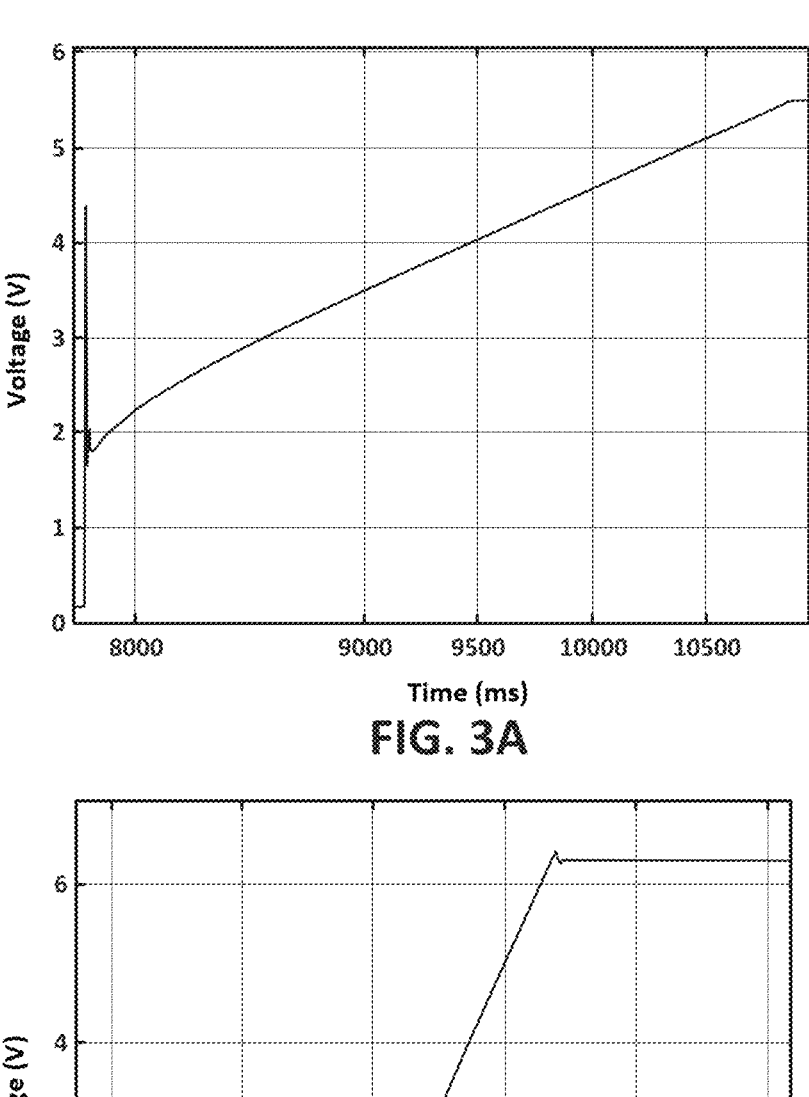
FIGS. 3A and 3B show the 100 mA continuous charge test performed with a 0.1 F and 5.5V supercapacitor, and with a 220 uF and 6.3V capacitor, respectively.

FIG. 3A shows a 100 mA continuous charge test performed with a 0.1 F and 5.5V supercapacitor, and FIG. 3B shows the same test for a 220 uF and 6.3V capacitor. The results are the following:

6.3V and 220 uF:

From 0 to 6.3V: Total time=83 ms; Power=7.75 uWh

From 0 to 3.3V: Total time=42 ms; Power=2.03 uWh

From 0 to 1.8V: Total time=20 ms; Power=0.71 uWh 5.5V and 0.1 F:

From 0 to 5.5V: Total time=3.21 s; Power=0.339 mWh

From 0 to 3.3V: Total time=1.01 s; Power=0.071 mWh

21% of the energy generated cannot be used

If the initial voltage is compared, using the 3.3V activation voltage in the entire mechatronic system, the wasted energy with the capacitor is only 2.03 uWh while the wasted energy with the supercapacitor is 339 uWh.

Bearing in mind that with the cascade activation methodology of the present invention the mechatronic system starts to operate from 1.8V of the microcontroller, the wasted energy is 0.71 uWh. In addition, the time until the minimum voltage is reached to start operating is 20 ms in the case of the capacitor and 1.01 seconds in the case of the supercapacitor.

Therefore, the present invention has the advantage that it reduces the activation times, making the mechatronic system faster in its activation, and the wasted energy is greatly reduced to the point of not needing batteries or supercapacitors.

On the other hand, in cases where the energy generated can vary, such as when it is a person who performs the mechanical movement to generate the energy, there may be cases in which the force used is not sufficient and there is not enough energy for the electronics to perform all the desired actions. And the opposite case can occur, in which the force used is too much and the movement time is very short, not giving the mechatronics time to perform all of its actions.

To solve these situations, the different energy curves of the electric generator are previously calculated, based on the different mechanical movements that are performed in the electric generator to generate energy, and the time it takes the electric generator to reach the different voltages is determined in order to predict the amount of energy it will generate. Thus being able to know if there is enough energy, with the mechanical movement performed, and if not, to stop the actions of the actuators/sensors and take advantage of the energy generated to give information to the user that the mechanical movement performed has not been correct.

Figures 5A, 5B:
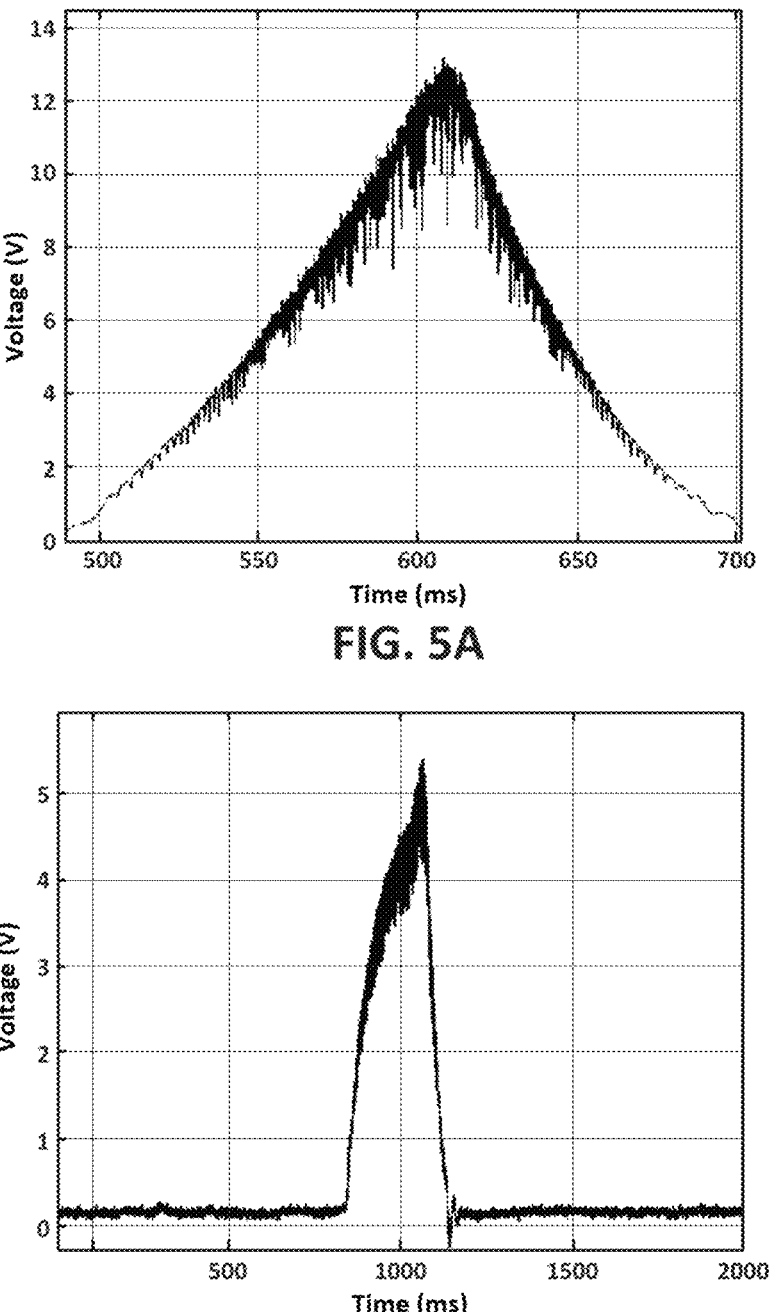
FIGS. 5A and 5B show two captures of one same electric generator with one same path, but with different pulsating forces.

FIGS. 5A and 5B show two captures of one same electric generator with one same mechanical movement, but the force used to perform the mechanical movement was different. As shown, the time it takes each one to reach each voltage value changes, such that by gathering only two voltage values at two different start-up times, it is possible to predict how much electrical energy is going to be generated.

Figure 6:
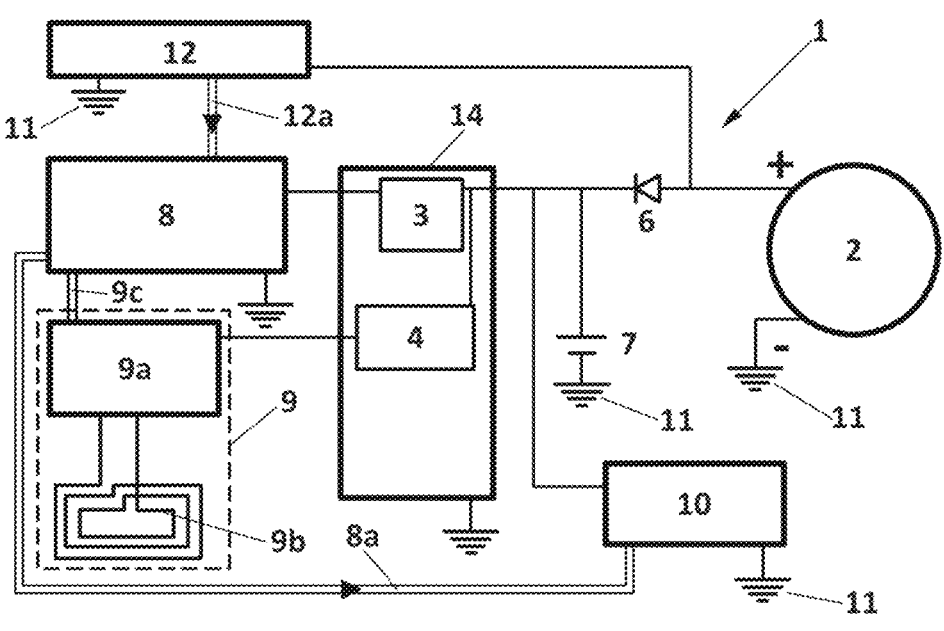
FIG. 6 shows an embodiment of the mechatronic system of the present invention.

With respect to the foregoing, FIG. 6 shows an embodiment of the system of the present invention that operates by "time measurements". In this embodiment, the microcontroller 8 has pre-programmed activation times of the voltage regulators, the sensors and the actuators. In other words, the microcontroller 8 records how much time elapses between the start-up of each voltage regulator (3, 4, 5). For example, in this way, it is known exactly how much time has elapsed from the time the electric generator 2 generates 1.8V to 3V.

Therefore, the cascade activation mechatronic system 1 shown in FIG. 6 comprises:

the electric generator 2 that generates variable voltage electrical energy from a minimum voltage to a maximum voltage, from mechanical energy;

the voltage converter 12 connected to the output of the electric generator 2 and grounding, wherein the voltage converter 12 is configured to generate and send the activation signal 12a to the microcontroller 8 to indicate to the microcontroller that the electric generator 2 is generating energy; the voltage converter 12 sends the signal to the microcontroller 8 for any voltage value greater than or equal to the minimum voltage of the electric generator 2;

the non-return diode 6 connected to the positive of the electric generator 2; the non-return diode 6 is used so that the energy stored both in the circuitry and in the capacitor 7 does not return to the electric generator 2 and remains stored in the capacitor 7;

the capacitor 7 connected between the output of the non-return diode 6 and grounding 11;

the multi-level regulator 14 that internally comprises the voltage regulator 3 and the voltage regulator 4; wherein:

the first voltage regulator 3 generates a first constant activation voltage greater than the minimum voltage of the electric generator 2;

the second voltage regulator 4 generates a second constant activation voltage greater than the first activation voltage;

the microcontroller 8 connected to an output of the multi-level regulator 14 which is connected in turn to the output of the first voltage regulator 3, wherein the microcontroller 8 has a power supply voltage equivalent to the first activation voltage and wherein the microcontroller 8 is activated upon receiving the first activation voltage from the first voltage regulator 3 and the signal 12a from the voltage converter 12;

the sensor 9 formed by the antenna controller 9a and the antenna 9b connected to an output of the multi-level regulator 14 which is connected in turn to the output of the second voltage regulator 4, wherein the antenna controller 9a and the antenna 9b have a power supply voltage equivalent to the second activation voltage; the antenna controller 9a has a communication bus 9c with the microcontroller 8 for the activation/deactivation of the sensor 9 (antenna 9b and antenna controller 9a) based on the pre-programmed times in the microcontroller 8; therefore, the antenna controller 9a and the antenna 9b are powered by the second voltage regulator 4 and are activated upon receiving the activation signal from the microcontroller 8 through the communication bus 9c;

the actuator 10 connected to the output of the electric generator 2 with interconnection of the non-return diode 6; the actuator 10 receives non-regulated power from electric generator 2; the microcontroller 8 has a communication bus 8a with the actuator 10 for the activation/deactivation of the actuator 10 based on the pre-programmed times in the microcontroller 8.

As indicated, the microcontroller 8 controls when the electric generator 2 is generating energy and when it is not through the voltage converter 12. The voltage converter 12, for example, transforms the voltage of the electrical energy generated by the electric generator 2 that is between 2.5V and 7V into a voltage of 2.5V that is accepted by the microcontroller 8 for signals that are not powered by the microcontroller 8. This allows the voltage converter 12 to be used as a sensor to indicate when the mechatronic system 1 starts to operate. It is also used to know when the electric generator 2 stops operating, indicating to the microcontroller 8 that it has to enter its idle state immediately and perform certain low-consumption operations such as saving data in a non-volatile memory or providing information to the user such as beeps or flashing of LEDs with the help of the remaining energy that is stored in the capacitor 7.

Figure 7:
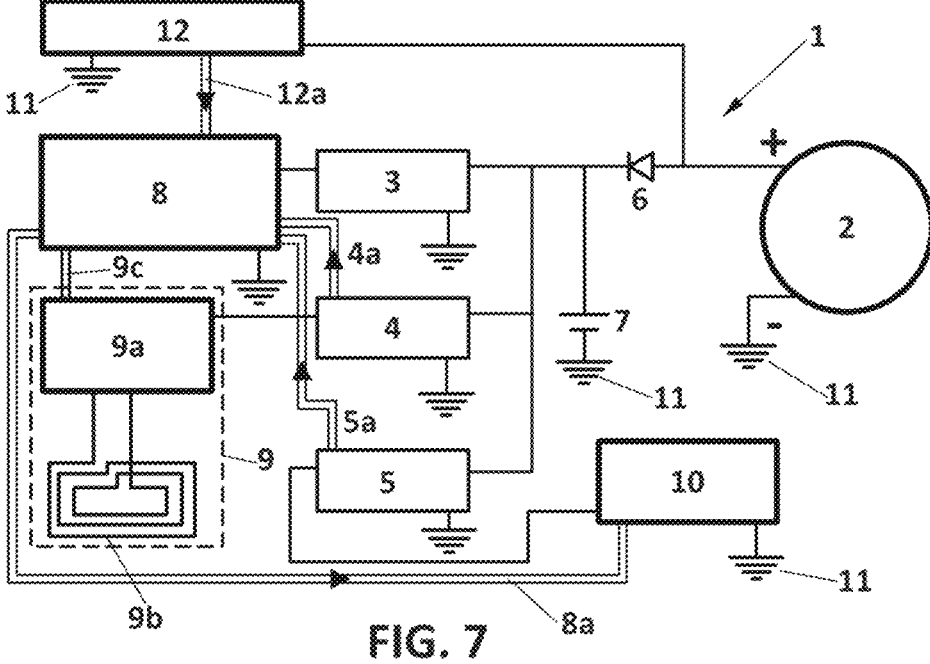
FIG. 7 shows an embodiment of the mechatronic system of the present invention.

Another embodiment of the system of the present invention is by "decentralized voltage meters", which is shown in FIG. 7. In this embodiment, the voltage regulators measure the voltage to their respective inputs and they are activated by measuring their respective activation voltages. When the voltage regulator is activated, it sends a signal to the microcontroller letting it know that the voltage regulator has been activated, leaving control of the activation of the voltage regulators. Therefore, the cascade activation mechatronic system 1 shown in FIG. 7 comprises:

the electric generator 2 that generates variable voltage electrical energy from a minimum voltage to a maximum voltage from mechanical energy;

the voltage converter 12 connected to the output of the electric generator 2 and grounding 11, wherein the voltage converter 12 is configured to generate and send an activation signal 12a to the microcontroller 8 to indicate to the microcontroller that the electric generator is generating energy, for any voltage value greater than or equal to the minimum voltage of the electric generator 2;

the non-return diode 6 connected to the positive of the electric generator 2;

the capacitor 7 connected between the output of the non-return diode 6 and grounding 11;

the first voltage regulator 3 connected to the output of the non-return diode 6, wherein the first voltage regulator 3 generates at its output a first activation voltage greater than the minimum voltage of the electric generator 2;

the microcontroller 8 connected to the output of the first voltage regulator 3, wherein the microcontroller 8 has a power supply voltage equivalent to the first activation voltage and wherein the microcontroller 8 is activated upon receiving the first activation voltage from the first voltage regulator 3 and the signal 12a from the voltage converter 12;

the second voltage regulator 4 connected to the output of the non-return diode 6, wherein the second voltage regulator 4 generates a second activation voltage greater than the first activation voltage; the microcontroller 8 has a communication bus 4a with the second voltage regulator 4 by which the microcontroller 8 receives the activation/deactivation signal from the second voltage regulator 4 when it is activated/deactivated, respectively;

the sensor 9 formed by the antenna controller 9a and the antenna 9b connected to the output of the second voltage regulator 4, wherein the antenna controller 9a and the antenna 9b have an activation/power supply voltage equivalent to the second activation voltage; the antenna controller 9a has a communication bus 9c with the microcontroller 8; therefore, the antenna controller 9a and the antenna 9b are powered by the second voltage regulator 4 and are activated upon receiving the activation signal from the microcontroller 8 through the communication bus 9c;

the third voltage regulator 5 connected to the output of the non-return diode 6, wherein the third voltage regulator 5 generates a third constant activation voltage greater than the second activation voltage; the microcontroller 8 has a communication bus 5a with the third voltage regulator 5 by which the microcontroller 8 receives the activation/deactivation signal from the third voltage regulator 5 when it is activated/deactivated, respectively;

the actuator 10 connected to the output of the third voltage regulator 5, wherein the actuator has a power supply voltage equivalent to the third activation voltage; the microcontroller 8 has a communication bus 8a with the actuator 10 for the activation/deactivation of the actuator 10; therefore, the actuator 10 is powered by the third voltage regulator 5 and is activated upon receiving the activation signal from the microcontroller 8.

Figure 8:
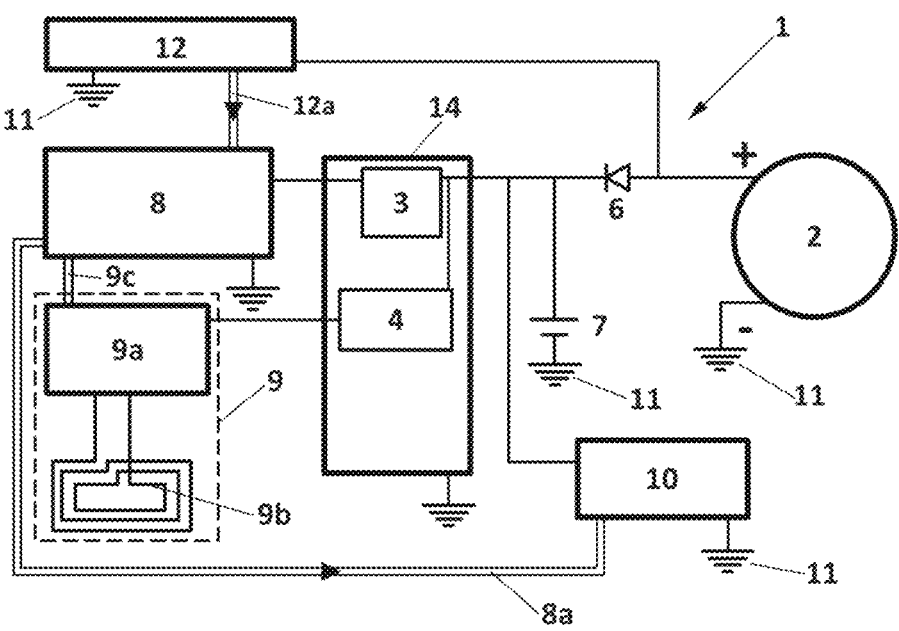
FIG. 8 shows an embodiment of the mechatronic system of the present invention.

FIG. 8 shows an embodiment of the system of the present invention that operates by "centralized voltage meters". In this embodiment, the voltage meter 13 measures the voltage at the input of the multi-level regulator 14 and communicates it to the microcontroller 8 so that the microcontroller 8 is the element that decides the moments when the sensors and actuators are activated. Therefore, the cascade activation mechatronic system 1 shown in FIG. 8 comprises:

the electric generator 2 that generates variable voltage electrical energy from a minimum voltage to a maximum voltage, from mechanical energy;

the non-return diode 6 connected to the positive of the electric generator 2;

the capacitor 7 connected between the output of the non-return diode 6 and the grounding 11;

the voltage converter 12 connected to the output of the electric generator 2 and grounding, wherein the voltage converter 12 is configured to generate and send an activation signal 12a to the microcontroller 8 to indicate to the microcontroller that the electric generator 2 is generating energy, for any voltage value greater than or equal to the minimum voltage of the electric generator 2;

the voltage meter 13 connected to the input of the multi-level regulator 14, wherein the voltage meter 13 is configured to measure the voltage at the input of the multi-level regulator 14;

the multi-level regulator 14 that internally comprises the voltage regulator 3 and the voltage regulator 4; wherein:

the first voltage regulator 3 generates a first constant activation voltage greater than the minimum voltage of the electric generator 2;

the second voltage regulator 4 generates a second constant activation voltage greater than the first activation voltage;

the microcontroller 8 connected to an output of the multi-level regulator 14 which is connected in turn to the output of the first voltage regulator 3, wherein the microcontroller 8 has a power supply voltage equivalent to the first activation voltage and wherein the microcontroller 8 is activated upon receiving the first activation voltage from the first voltage regulator 3 and the signal 12a from the voltage converter 12;

the sensor 9 formed by the antenna controller 9a and the antenna 9b connected to an output of the multi-level regulator 14 which is connected in turn to the output of the second voltage regulator 4, wherein the antenna controller 9a and the antenna 9b have a power supply voltage equivalent to the second activation voltage; the antenna controller 9a has a communication bus 9c with the microcontroller 8 for the activation/deactivation of the sensor 9 (antenna 9b and antenna controller 9a) based on the voltage measured by the voltage meter 13; therefore, the antenna controller 9a and the antenna 9b are powered by the second voltage regulator 4 and are activated upon receiving the activation signal from the microcontroller 8 through the communication bus 9c;

the actuator 10 connected to the output of the non-return diode 6 from which it receives unregulated power from the electric generator 2; the microcontroller 8 has a communication bus 8a with the actuator 10 for the activation/deactivation of the actuator 10 based on the voltage measured by the voltage meter 13; therefore, the actuator 10 is powered by the electric generator 2 and is activated upon receiving the activation signal from the microcontroller 8 through the communication bus 8a.

Regarding the cascade activation method, the steps that define the method/methodology are the following:

1. Analyzing the mechatronic system according to the following sub-steps:
   A. listing the elements of the mechatronic system that require power;
   B. calculating the minimum activation (power supply) voltage required for each element listed in the previous sub-step;
   C. calculating the activation time interval in which each element is activated;
   D. calculating the activation sequence of the elements based on the minimum activation voltage and the activation time interval of each element in such a way that the activation sequence:
      starts at the lowest activation (power supply) voltages and builds up to the highest activation (power supply) voltages; and,
      in case two or more elements have equal activation (power supply) voltages, the activation sequence prioritizes the element with the longest activation time interval.

2. Selecting the electric generator (2) based on the energy/power that needs to be provided to the mechatronic system (1). In other words, the electric generator (2) must provide an energy/power equal to or greater than the sum of all the energies/powers of all the elements comprised in the mechatronic system (1) and that consumes energy/power, such as at least the microcontroller (8), the voltage regulators (3, 4, 5), the sensor (9) and the actuator (10), and optionally, at least the capacitor (7).

3. Programming the microcontroller (8) with the activation sequence. Optionally, programming the microcontroller (8) with additional control parameters of the mechatronic system (1) such as: control and warning the user of a malfunction, insufficient energy, incorrect readings, etc.

4. Programming the microcontroller (8) to perform additional functions in case the capacitor (7) has stored energy. Examples of said additional functions are storage in the internal memory of the microcontroller (8), lighting a warning LED, Flip-Dot, etc.

The invention claimed is:

1. A cascade activation mechatronic system, comprising:
a first component requiring a first voltage to activate, wherein the first component receives the first voltage at a first time to activate the first component; and a second component requiring a second voltage to activate, the second voltage being greater than the first voltage, and wherein the second component receives the second voltage at a second time to activate the second component;

wherein the second component comprises an antenna for sending and receiving data.

2. The cascade activation mechatronic system according to claim 1, wherein the first component is a microcontroller for controlling operation of the mechatronic system.

3. The cascade activation mechatronic system according to claim 2, wherein the antenna is a sensor connected by a bus to the microcontroller.

4. The cascade activation mechatronic system according to claim 1, wherein the second component comprises a mechanical actuator in the mechatronic system.

5. The cascade activation mechatronic system according to claim 1, further comprising an electric generator for generating a variable voltage including the first and second voltages.

6. The cascade activation mechatronic system according to claim 5, further comprising a voltage regulator coupled between the electric generator and the first component, the voltage regulator regulating a voltage from the electric generator to the first component to remain at the first voltage as the voltage from the electric generator varies.

7. The cascade activation mechatronic system according to claim 5, wherein the variable voltage generator ramps up the voltage over time.

8. The cascade activation mechatronic system according to claim 7, wherein, after ramping up the voltage, the electric generator ramps down the voltage over time, the second component deactivating at a third time after the second time when the voltage generated by the electric generator falls below the second voltage.

9. The cascade activation mechatronic system according to claim 8, the first component deactivating at a fourth time after the third time when the voltage generated by the electric generator falls below the first voltage.

10. A method of activating a mechatronic system comprising first and second components, comprising the steps of:

generating a variable voltage over time;

supplying a first voltage to the first component when the first voltage is generated, the first component requiring at least the first voltage to activate the first component, and supplying a second voltage, greater than the first voltage, to the second component when the second voltage is generated, the second component requiring at least the second voltage to activate the second component;

wherein supplying the second voltage to the second component comprises the step of supplying the second voltage to an antenna for sending and receiving data.

11. The method of activating a mechatronic system according to claim 10, wherein supplying the first voltage to the first component comprises the step of supplying the first voltage to a microcontroller for controlling operation of the mechatronic system.

12. The method of activating a mechatronic system according to claim 10, wherein supplying the second voltage to the second component further comprises the step of supplying the second voltage to a mechanical actuator in the mechatronic system.

13. The method of activating a mechatronic system according to claim 10, wherein supplying the second voltage to the second component further comprises the step of supplying the second voltage to a sensor connected by a bus to the microcontroller.

14. The method of activating a mechatronic system according to claim 10, further comprising the step of regulating a voltage to the first component to remain at the first voltage as the variable voltage is generated.

15. The method of activating a mechatronic system according to claim 10, wherein said step of generating a variable voltage over time comprises the step of ramping up the voltage over time.

16. The method of activating a mechatronic system according to claim 10, wherein receipt of the first voltage activates the first component.

17. The method of activating a mechatronic system according to claim 16, wherein receipt of the second voltage activates the second component.

18. The method of activating a mechatronic system according to claim 17, wherein said step of generating a variable voltage comprises the step of ramping down the voltage over time after the voltage has been ramped up over time.

19. The method of activating a mechatronic system according to claim 18, further comprising the step of deactivating the second component when the ramping down voltage falls below the second voltage.

20. The method of activating a mechatronic system according to claim 19, further comprising the step of deactivating the first component when the ramping down voltage falls below the first voltage.

* * * * *